Patented Mar. 23, 1948

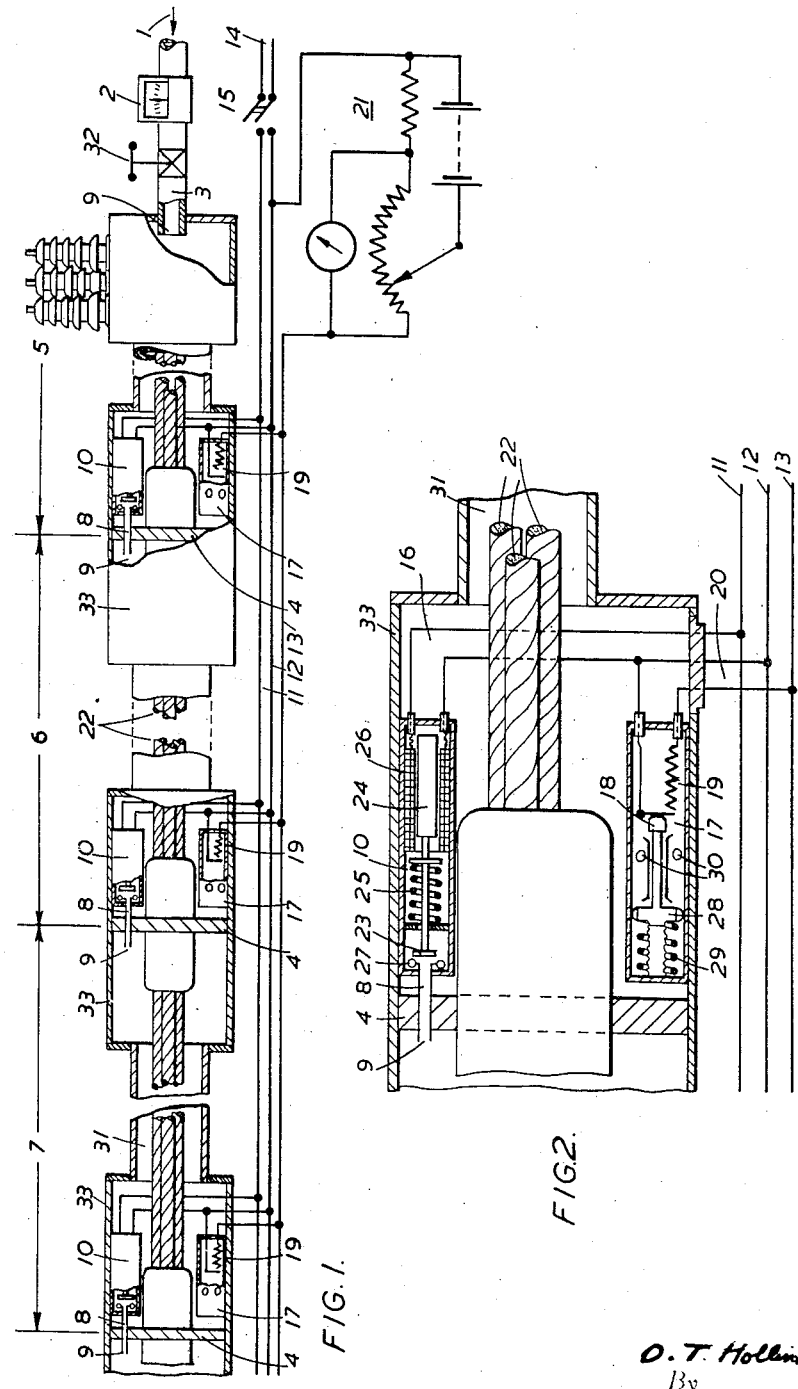

2,438,441

UNITED STATES PATENT OFFICE 2,438,441

MEANS FOR DETECTING LEAKS IN ELECTRIC CABLES CONTAINING FLUID UNDER PRESSURE

Douglas Taft Hollingsworth, London, England, assignor to British Insulated Callender's Cables Limited, London, England, a British company Application October 21, 1946, Serial No. 704,582
In Great Britain November 6, 1945

1 Claim. (Cl. 177—311)

At the present time there are a number of electric cable systems in which the dielectric in the cables is maintained at a pressure in excess of atmospheric pressure by means of pressure fluid in the cable or in the pipe line in which the cable is enclosed. In such systems there is the problem of detecting leaks of pressure fluid, both as to their existence and as to their locality. In a known method available in some cases, switches, each automatically actuated by a drop of pressure in its neighbourhood, are arranged at different points in the system, for instance at cable joints, and on fall of pressure close a circuit to put a resistance across a pilot line embodied in the system or associated with it. Each of the switched resistances is of different value so that by measurement at a control or observation station, for instance a sub-station in the system, of the value of the resistance across the line it is possible to determine when any switch is closed and the locality of the switch. A convenient method of measurement is provided by an automatic Wheatstone bridge.

The possibility of utilising this method of detection is dependent upon the system being such that when a leak in the enclosure occurs an appreciable fall of pressure will take place in its neighbourhood. There is in most systems provision for feeding in pressure fluid automatically to maintain the pressure at or near the desired value and for this purpose, or for some other purpose, in many arrangements there is comparatively free flow of pressure fluid along the whole or substantial parts of the length of the system. Accordingly, in these cases the conditions for the localisation of pressure drop do not exist and the described arrangement cannot be employed effectively.

The present invention deals with these cases and makes it possible to utilise pressure-actuated indicating switches on a pilot line for the purpose of showing at a station the locality of the leak. This is done by combining with such a system a series of barriers (for instance one in each joint box) dividing the cable system into sections, each barrier having a passage through or round it which is normally open but may be closed by an electrically operated valve under the control of an observer at the station. These may be solenoid-operated valves connected across a line which can be put at the station in circuit with a source of current so that the solenoids are all simultaneously excited when a switch is closed and in that way the pressure fluid system is temporarily divided up into sections at will.

The method of procedure is as follows. When the existence of a leak has been observed, for instance by the showing of an abnormal rate of inflow of make-up pressure fluid along it, the sectionalizing valves are closed. This provides appropriate conditions for the operation of the automatic pressure switch in the section in which the leak exists. It is then only necessary to wait a sufficient length of time for an automatic pressure switch to close and then to observe the resistance put into the pilot circuit. The time taken for the fall of pressure to the point of actuation of the switch is a rough indication of the magnitude of the leak.

The invention is further described hereinafter with reference, by way of example, to the accompanying diagrammatic drawings wherein; Figure 1 represents a portion of the cable system embodying the invention, and Figure 2 represents a part of Figure 1 on a larger scale. The system comprises a pipe-line 31 enclosing cable conductors 22 and adapted to contain pressure fluid to maintain the conductor dielectric at a pressure in excess of atmospheric pressure. For the purpose of maintaining the required pressure, fluid enters the system in the direction of the arrow 1, through a rate-of-flow indicator 2, by an entry 3 containing a valve 32. Barriers 4, which may be conveniently situated in cable joint boxes 33, divide the system into sections. The drawing indicates an end section 5 and the next two adjacent sections 6 and 7. The movement of pressure fluid between adjacent sections is restricted to a passage 8 through each barrier 4. One end 9 of each passage is permanently open and the other is terminated by a valve 10 which is normally open but adapted to be closed electrically. Throughout the system there extend three pilot conductors 11, 12 and 13. For convenience of illustration the pilot conductors are shown extending outside the pipe line, they may, however, be enclosed in the pipe line with the main conductors 22. Two of these conductors (11, 12) are adapted to be connected to a convenient source 14 of electric current by means of a switch 15 at a control station. By closing this switch 14 each valve 10, being connected by leads 16 across the pilot conductors 11, 12, is caused to close electrically. Thereby the passages 8 are all closed, and the movement of fluid between adjacent sections is prevented. The valve 10 may comprise a container into one end of which enters the passage 8. A closure member 23 mounted on the end of an axially movable plunger 24 is normally held away from the end of the passage 8 by a compression spring 25. A solenoid 26 connected to the leads 16 is energised when the switch 15 is closed, thereby causing the plunger 24 to move against the spring 25 so that the closure member 23 is seated on and closes the end of the passage 8. Ports 27 are provided in the wall of the valve container to permit the movement of the pressure fluid into and out of the container.

Also incorporated in each section is an automatic pressure switch 17, the movable member 18 of which operates to close the switch when the pressure in the section falls below a prearranged value. The member 18 may be an axially movable plunger attached to a gas-tight piston 28, and associated with a compression spring 29 which tends to move the plunger towards the switch-closing position. Ports 30 in the switch casing permit entrance of pressure-fluid, the pressure of which on the piston 28 is normally sufficient to overcome the pressure of the spring 29 and so hold the plunger in the switch-open position. A resistance 19 associated with each automatic switch 17 is adapted to be connected by means of leads 20 across the pilot conductors 12 and 13 when the switch 17 closes. The resistances 19 have different values, each of which is recognizable as being associated with a particular section. The pilot conductors 12 and 13 are connected at the control station to a resistance measuring bridge 21.

When the rate-of-flow indicator 2 shows that there is an abnormal inflow of pressure fluid into the system, such as is consistent with a leakage of fluid from the system, the switch 15 is closed. Thereby the valves 10 are closed and the system is completely sectionalized. Continued loss of fluid at the leak will cause the pressure to fall in the section concerned, until, when this fall in pressure reaches a pre-arranged value, the corresponding automatic pressure switch 17 will close. Thereby the associated resistance 19 will be connected over the pilot conductors 12 and 13 with the measuring bridge 21.

The value of the resistance 19 obtained by means of the bridge will be an indication of the particular section which is leaking.

The electrically operated valves 10 are preferably made so as to be capable only of holding a sufficient pressure difference to ensure the actuation of the automatic valve 17. They should then open under pressure to a sufficient extent to prevent further fall of pressure in the leaky section so that the pressure in that section does not decrease to a value at which dielectric breakdown will occur.

What I claim as my invention is:

In an electric cable system in which the conductor dielectric is normally subject to a pressure above atmospheric pressure in an enclosure containing fluid under pressure, barriers dividing the fluid-containing enclosure into sections, a by-pass passage for the said fluid at each of the said barriers, a normally open valve for each of the said passages, electrically operable closing means for each of said valves, a pilot line connected with all the said closing means and energisable from a control station to close all the said valves simultaneously, an electrical resistance associated with each section, a section pilot line extending from a resistance-measuring means at the control station, and in each section a pressure-controlled switch automatically connecting the resistance associated with the section in circuit with the said second pilot line and the said resistance-measuring means when the pressure in this section falls below a preselected value.

DOUGLAS TAFT HOLLINGSWORTH.

REFERENCES CITED

The following references are of record in the file of this patent:

UNITED STATES PATENTS

| Number | Name | Date |
|---|---|---|
| 2,063,187 | Nyquist | Dec. 8, 1936 |
| 2,092,560 | Runaldue | Sept. 7, 1937 |